Figure 1:
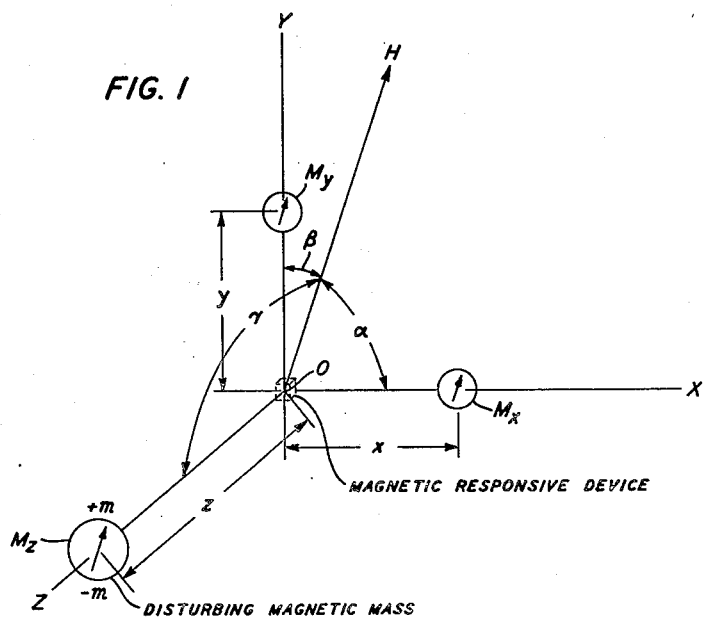

April 18, 1950 C. H. YOUNG 2,504,778
MAGNETIC COMPENSATION SYSTEM
Filed May 16, 1947 3 Sheets-Sheet 1

INVENTOR
C. H. YOUNG
BY
Walter M. Hill
ATTORNEY

April 18, 1950  C. H. YOUNG  2,504,778
MAGNETIC COMPENSATION SYSTEM
Filed May 16, 1947  3 Sheets-Sheet 2

INVENTOR
C. H. YOUNG
BY
Walter M. Hill
ATTORNEY

Patented Apr. 18, 1950

2,504,778

UNITED STATES PATENT OFFICE 2,504,778

MAGNETIC COMPENSATION SYSTEM

Clarence H. Young, Lincoln Park, N. J., assignor to Bell Telephone Laboratories, Incorporated, New York, N. Y., a corporation of New York Application May 16, 1947, Serial No. 748,421

13 Claims. (Cl. 175—183)

This invention relates to magnetic compensation systems and more particularly to a magnetic compensation system in which the effect of a magnetic mass on a sensitive magnetic responsive device located exterior of that mass is nullified.

In the operation and use of sensitive magnetic responsive devices as, for example, magnetometers or compasses, the presence of a magnetic mass located within the field of influence of the magnetic responsive device causes errors in response. The effect of such a mass is easily discernible when the angle between the line joining the centers of the disturbing mass and the sensitive device is varied with respect to the direction of the ambient field in which the system is immersed.

It has been discovered that if the disturbing magnetic mass is made to appear substantially spherical in shape, compensation may be achieved by employing other magnetic masses, also of spherical shape, located in fixed positions with respect to the axis or line joining the centers of the disturbing mass and the sensitive device. These other masses then provide an exactly opposite or balancing effect at the sensitive device. In order for such compensation to be of any practical value for systems which must be moved about in the ambient field it must be of such a character that the disturbing effect is always completely nullified regardless of the angular relationship between any arbitrary axis of the system and the direction of the ambient field. In this connection it may be pointed out that a spherical magnetic mass will always have induced in it a magnetic dipole having its axis parallel with the external inducing field. It can be shown mathematically that the magnitude of the magnetic moment produced by this dipole is independent of the permeability of the material of which the sphere is composed (so long as the permeability is high) and is substantially equal to the product of the cube of the radius of the sphere and the strength of the inducing magnetic field exterior of the sphere. By "high permeability" is meant a permeability greater than 30.

It is the object of this invention to provide a means for compensating or nullifying the magnetic effect of a magnetic disturbing mass upon a magnetic responsive device located exterior to that mass and within a common ambient magnetic field.

The foregoing object is achieved by this invention which provides a means for compensating for the effect of a magnetic disturbing mass of arbitrary shape by combining therewith at least two additional spheres of magnetic material and a means for supporting said spheres and said disturbing mass with their magnetic centers on a system of at least three orthogonal axes with said device at the origin of said axes, the sizes of said compensating masses and their distances from the origin being proportioned to eliminate the effect of the dipole on the magnetic field at said device.

Figure 2:
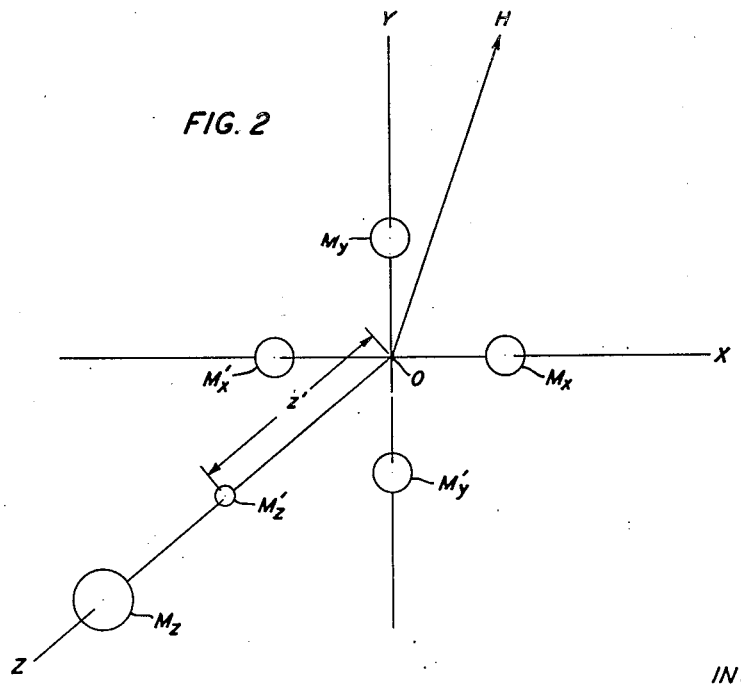
Figure 3:
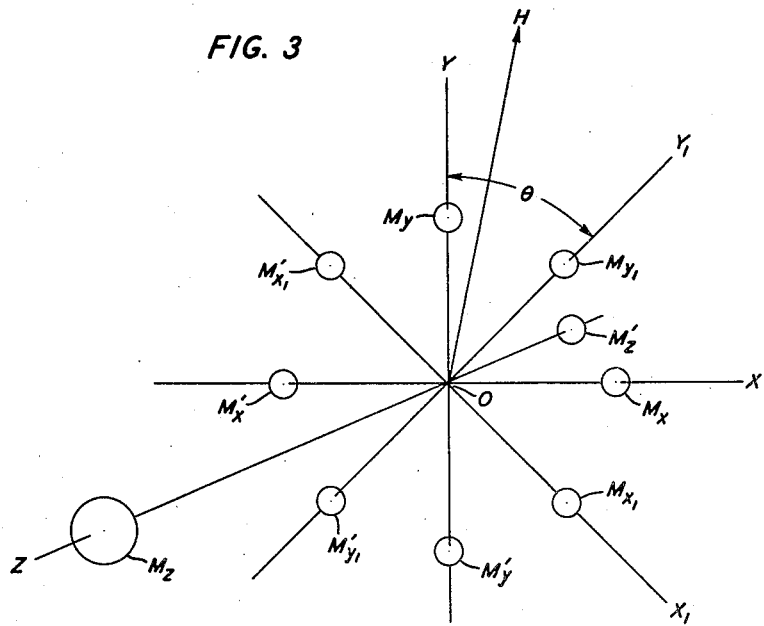
Figure 4:
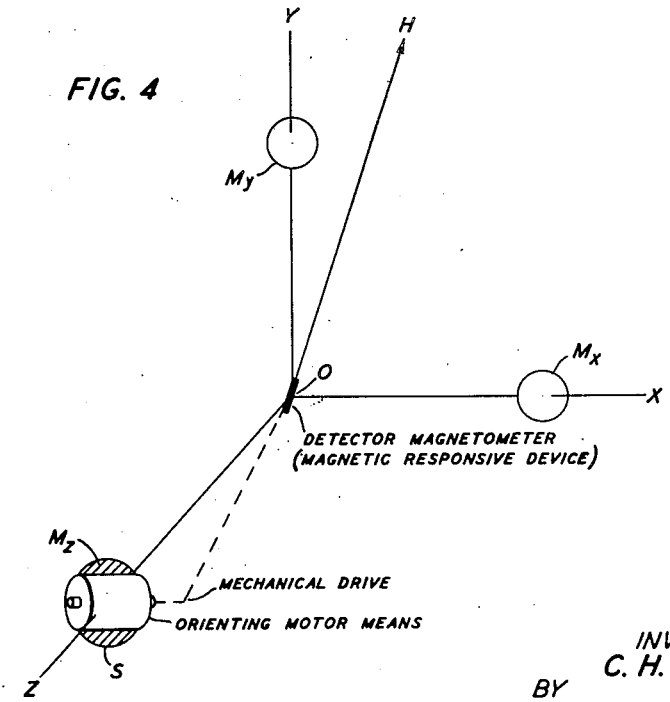
Figure 5:
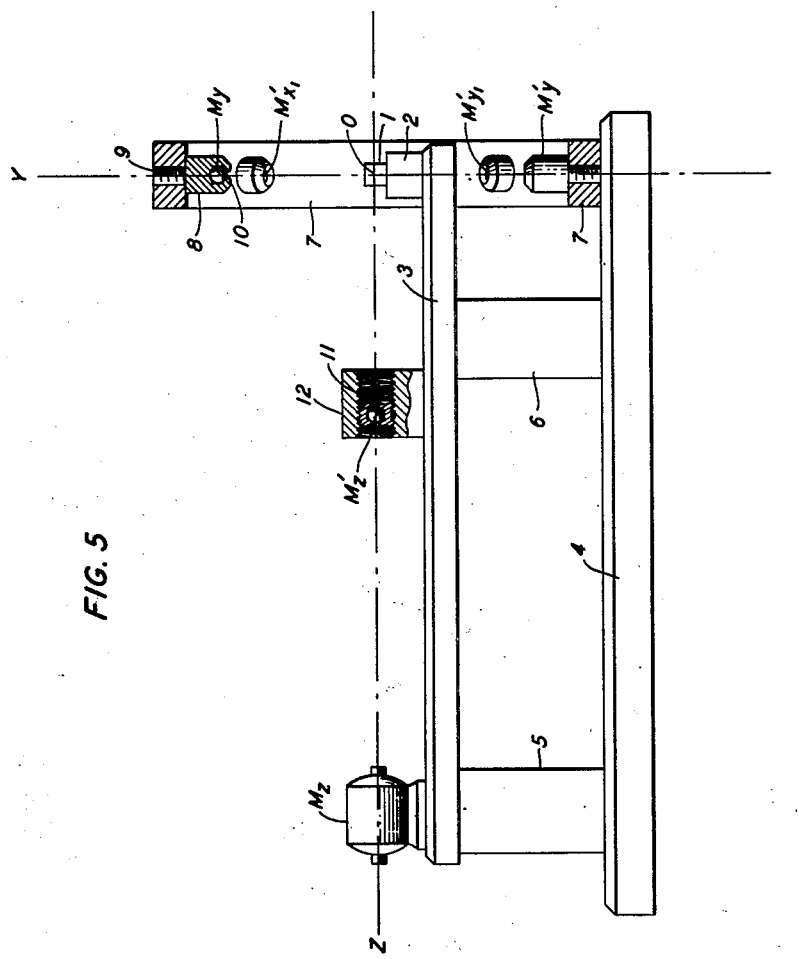

The invention may be better understood by referring to the accompanying drawings in which:

Fig. 1 shows the simplest and most elementary embodiment of the invention;

Fig. 2 discloses a modification of the arrangement shown in Fig. 1 with the addition of an adjusting sphere;

Fig. 3 schematically discloses a somewhat more practical embodiment of the invention;

Fig. 4 schematically illustrates the use of the invention in connection with an automatically oriented magnetic responsive device; and Fig. 5 illustrates one physical embodiment of the principles of this invention.

Before proceeding with a detailed description of the several figures just enumerated, it may be reiterated that the invention is predicated largely upon the physical phenomenon that the direction of the magnetic dipole in a spherical body is always parallel with the direction of the magnetic field inducing it and, furthermore, upon the discovery that if at least two compensating spheres are arranged with the disturbing mass (which, if not already spherical, must be rendered substantially spherical) so that their magnetic centers lie on orthogonal axes with the magnetic responsive device at the origin, substantially complete compensation can be achieved. Compensation, theoretically, is good only at the point of the origin and if the magnetic center of the detecting or magnetic responsive device is located at this point the full benefits of the compensation provided by this invention may be realized.

Referring now to Fig. 1, there is disclosed in schematic form a magnetic responsive device located at the point O. This device may be of any form as, for example, it may be a magnetometer or it may be a compass element responsive to the field in which the device is immersed, usually the earth's field. Located in fixed relationship with this magnetic responsive device and at a fixed distance $z$ is a disturbing magnetic mass $M_z$. For the purposes of the present description it may be assumed that this disturbing mass is of spherical shape as illustrated in the figure. This disturbing mass may initially be of some arbitrary shape far from spherical in which case it must be made to appear spherical in a magnetic sense. The direction of the ambient magnetic field is represented by a vector H. This vector is shown passing through the magnetic responsive device at point O. It must be understood that a field of the same magnitude and direction is effective on the disturbing magnetic mass so as to induce therein a pair of poles of unit strength $+m$ and $-m$ at opposite sides of the sphere as shown. As this dipole has both magnitude and direction, it may be represented by the small vector shown or it may be thought of as comprising poles of strength $m$ of opposite polarity near opposite ends of a diameter of the sphere. As previously state, the magnetic moment of the sphere is substantially equal to the product of the cube of the radius of this disturbing magnetic mass and the intensity of the inducing field vector H. The field vector H may form any arbitrary angle $\gamma$ with respect to the line joining the magnetic centers of the magnetic responsive device at point O and the disturbing magnetic mass. This line may be denoted the Z axis of the orthogonal system X, Y and Z shown in the figure.

Now, in accordance with this invention, if two compensating spheres $M_x$ and $M_y$ are located with their magnetic centers lying on the X and Y axes, respectively, there are points $x$ and $y$ at which they may be adjusted along their respective axes where complete compensation of the effect of the disturbing magnetic mass at point O may be achieved. The fact that complete compensation is achieved can be proved mathematically.

A simple method of determining initially the sizes of the two compensating spheres is to select radii such that the ratio of their radii to their respective distances from the origin is equal to the ratio of the radius of the disturbing sphere to its distance from the origin. This may be expressed mathematically as follows:

$$\frac{r_x}{x} = \frac{r_y}{y} = \frac{r_s}{s} \qquad (1)$$

where: $r_x$, $r_y$ and $r_s$ are the radii of spheres $M_x$, $M_y$ and $M_s$, respectively, and $x$, $y$ and $z$ are the distances shown in Fig. 1.

Other methods may be used in determining the sizes of these compensating spheres. However, the above method is believed the simplest. Having once thus established their substantially correct sizes, their respective distances from the origin may be slightly adjusted until exact compensation is achieved. It should be noted that since the direction of the field vector H may form any arbitrary direction angles with respect to the three orthogonal axes as, for examples, angles $\alpha$, $\beta$ and $\gamma$ respectively, as shown in Fig. 1, it is immaterial how this system is oriented with respect to the direction of the ambient field.

Since the directions of the induced dipoles in the two compensating spheres are parallel with the ambient field vector, they are also parallel with the direction of the dipole in the disturbing magnetic mass. Consequently, if either one of the compensating spheres is moved to an equidistance on the opposite side of the origin but along the same axis, the effect of the compensation is unchanged. That is to say, changing position of either compensating sphere to an equidistance on the opposite side of the origin does not change the effect of its compensation at the origin. It has been discovered that either compensating mass may be arbitrarily divided into two or more spherical parts and that these parts may be distributed at different distances along the axis and adjusted to the point where the total effect of the several compensating parts on the same axis is equivalent to the effect of the original single compensating mass. Moreover, some of these compensating parts may lie on one side of the origin and the remaining ones on the other side. It may be stated at this point that not only may the compensating spheres be in several parts but the disturbing mass may also comprise two or more spheres.

An arrangement of this type is shown in elementary form in Fig. 2. Here it will be noted that the compensating sphere on the X axis has been divided into two parts symmetrically disposed on either side of the origin O. These two parts are denoted $M_x$ and $M_x'$. A similar division is shown on the Y axis. If it is assumed for a particular case that the two compensating masses on either axis are of equal size and are at equal distances from the origin which distances are the same distance as for the original single compensating mass, their radii would have to be smaller than the radius of the single mass by a ratio of a cube root of two.

An additional advantage may also be noted for the arrangement shown in Fig. 2. In Fig. 1 the system is rather sensitive to the exact location in the $x$—$y$ plane of the magnetic responsive device with respect to the origin O. It is to be understood in this connection that the origin O is a fixed point in the orthogonal system determined by the intersection of a perpendicular to the $x$—$y$ plane, which perpendicular also passes through the magnetic center of the disturbing mass. When the compensating masses are divided into two parts as shown in Fig. 2, this requirement is eased considerably and it is found that the compensation is considerably more tolerant of variations from exact coincidence of the magnetic center of the magnetic responsive device and the origin O.

It has been found quite expedient to either move the four compensating spheres of Fig. 2 slightly closer to the origin or to increase their size slightly in order to slightly overcompensate. This overcompensation is then corrected by adding an additional adjusting sphere $M_s'$ shown on the Z axis in Fig. 2 and at a distance $z'$ from the origin. This small adjusting sphere is arranged for adjustment parallel with the Z axis so that its distance $z'$ is such as to just correct for the overcompensation provided by the compensating spheres. This is of particular value where the distance from the origin for each of the compensating spheres is fixed by design and since slight inaccuracies are bound to occur in any construction, it is most convenient to carry this error deliberately on the side of overcompensation and provide for its correction by a single adjustment as shown in Fig. 2.

Referring now to Fig. 3, it will be noted that an additional refinement has been added. Here the number of compensating spheres has been increased to eight. It will also be noted that a second orthogonal system has been superimposed upon the first. The first orthogonal system is represented by the axes X, Y and Z. The second orthogonal system has its Z axis in common with the first one. However, the other two axes $X_1$ and $Y_1$ are rotated through an angle $\theta$. Since the Z axis is common to both orthogonal systems, it is obvious that the axes X, Y, $X_1$ and $Y_1$ all lie within a plane normal to the Z axis. It has been found that if these eight spheres are located in the plane of the X and Y axes and with their centers at a distance from the origin O equal to the distance of an original two spheres of equal size, that their radii may be smaller than the two spheres by a ratio of the cube root of four. Moreover, the angle $\theta$ need be no particular angle although preferably it is made 45 degrees. A minimum limitation is imposed, however, when the angle becomes so small that the magnetic moment of one sphere begins to react upon an adjacent sphere so that their respective dipoles are no longer exactly parallel with the inducing field H. In practice, if the angle is made 45 degrees no difficulty has been found with such interference. It will also be noted in Fig. 3 that the adjusting sphere $M_x'$ has been located on the opposite side of the origin from that shown in Fig. 2. However, either arrangement could be used as the effect is the same in either case.

Just as the arrangement of four compensating spheres in Fig. 2 was more tolerant of the position of the magnetic responsive device with respect to the origin, so also is the arrangement shown in Fig. 3 more tolerant than was the arrangement of Fig. 2. It has been found that the displacement of the magnetic center of the magnetic responsive device with respect to the origin O and within the X—Y plane may vary considerably without producing any appreciable error in the compensation. One requirement, however, is necessary and that is that the magnetic center must remain substantially within the plane defined by the X and Y axes. There is an exception to this requirement when the disturbing mass comprises two or more spheres with about half of them on one side of the origin and the rest located on the other side.

The arrangement shown in Fig. 4 schematically illustrates a practical embodiment of the invention wherein the magnetic responsive device is an oriented magnetometer automatically maintained in alignment with the direction of an ambient magnetic field by means of an electric motor means through a mechanical drive as shown. The electric motor means, because of its mechanical drive, must necessarily be within reasonable proximity to the magnetometer and, therefore, it constitutes a disturbing magnetic mass. The disturbance created thereby is compensated in the manner illustrated in Fig. 1 by means of compensating magnetic masses $M_x$ and $M_y$. Of course, any of the other compensating arrangements shown in Figs. 2 and 3 may be employed instead of the single sphere on each of the two coordinate axes. The arrangement here shown is illustrative of the type of apparatus disclosed in the copending application of E. P. Felch and T. Slonczewski filed April 20, 1943, Serial No. 483,755, now Patent No. 2,468,968, issued May 3, 1949. A complete description of that structure need not be included here as it is unnecessary to the understanding of the present invention. However, it may be stated that the copending application covered an oriented total field magnetic detector in which the detector magnetometer is kept in alignment with the direction of the ambient field represented by the field vector H in Fig. 4. Two motors were actually used for accomplishing this automatic orientation. However, for the purposes of the present invention it is unnecessary to show both of these motors. In fact, whether one, two or more motors are used is quite immaterial. However, in accordance with the principles of this invention it is necessary that the disturbing mass thus created by the motor or motors must be rendered substantially spherical in a magnetic sense before the benefits of this invention may be realized.

In Fig. 4 the electric motor means illustrated by a single orienting motor constitutes the disturbing magnetic mass $M_z$. It is assumed that this motor does not constitute a spherical magnetic mass in a magnetic sense and consequently requires some adjustment to bring it into a substantially spherical form. The means for producing this desired magnetic effect is well known to those versed in the magnetic art and is obviously different for disturbing magnetic masses of different magnetic configuration. In the general case, however, it may be stated that if the geometrical configuration of the body is not of a spherical shape and if it is brought into a substantially spherical shape by means of suitable magnetic material of high permeability, it will have substantially the properties of a sphere which is all that is required for the practice of this invention. In Fig. 4 this is accomplished for the single motor, by an annular ring S placed about the motor and of such dimensions as to bring the entire mass into substantially the shape of a sphere. It may here be stated that it has been found that some electric motors require little or no correction. It has also been found that where two motors are placed close together and together constitute a single disturbing magnetic mass, a substantially spherical shape (in so far as its magnetic effect is concerned) may be achieved by the use of a single rod of magnetic material suitably disposed on the minor magnetic axis created by the two motors so as to achieve an over-all substantially spherical magnetic effect. The correction of a disturbing magnetic mass to conform to a substantial sphere magnetically is not a difficult problem and while a considerable variety of simple methods of achieving this effect are available depending in each case upon the configuration of the original mass, one method is always operative and that is to simply complete the disturbing mass until it conforms substantially to the geometric shape of a sphere by filling the voids with magnetic material in the manner illustrated in Fig. 4.

In Fig. 5 there is illustrated one physical embodiment of the present invention in a preferred form. In this figure, it is assumed that the magnetic responsive device is included in the enclosure 1 supported by a suitable support 2. All supports in this entire system must be made of non-magnetic material. For highly sensitive devices it has been found that most brass is very unreliable as a non-magnetic material. Material commonly known as German silver has been found much better. Of course, how careful one must be in selecting the non-magnetic material depends altogether on the sensitivity of the magnetic responsive device. If it is relatively insensitive but nevertheless disturbed by the proximity of the disturbing mass many materials otherwise unsuitable, including brass, may be used.

The non-magnetic support 2 is supported on a platform 3 which in turn is supported upon a main base 4 by means of legs 5 and 6. The magnetic responsive device 1 is assumed to be disturbed by the presence of a magnetic disturbing mass $M_z$ which is illustrated here as an electric motor. This motor is also fixedly supported upon the platform 3 with its magnetic center at a fixed distance from the magnetic center of the magnetic responsive device 1. The magnetic center of the magnetic responsive device 1 is located at the origin O of a system of the type shown in Fig. 3. A line passing through this center and the magnetic center of the disturbing mass $M_z$ may constitute an axis designated the Z axis corresponding, of course, to the same axis in Fig. 3.

Mounted upon the base plate 4 is to be found a non-magnetic annular structure 7 constituting a support for the eight compensating spheres $M_y$, $M_y'$, $M_{x1}'$, $M_{y1}'$, etc. The centers of these spheres all lie within a plane just as previously described for Fig. 3 and each of the spheres is supported in a recess in a German silver cup and is securely held in place within this recess by spinning over the outer lip at 10. These German silver cups may be mounted on the annular ring 7 by any suitable means, as for example, by threading a shank 9 as shown in section in Fig. 5. It is to be understood, of course, that the plane in which the centers of these compensating spheres lie is defined by the XY axes just as in Fig. 3 and that the Z axis is normal to this plane at point O. Also, as has been previously mentioned, point O should lie within this plane although it need not lie exactly at the center of the circle defined by the centers of the compensating spheres because it has been found that an array of eight compensating spheres is quite tolerant of eccentricity.

In accordance with the principles discussed above in connection with Fig. 2, each of the compensating spheres are deliberately constructed slightly larger than necessary to completely compensate the effect of the disturbing mass $M_z$ at point O. It is much easier to do this than to make them exactly right. Compensation is then completed by means of the adjusting sphere $M_z'$ the magnetic center of which must lie along the Z axis as shown in Fig. 5. This adjusting sphere may be mounted in the same manner as the compensating spheres on annular ring 7. However, in this case the German silver cup should be threaded on its outer surface as shown at 11. A slotted end to receive a screwdriver then permits adjustment longitudinally along the Z axis in an obvious manner. The threads on the German silver support 11 cooperate with internal threads in a non-magnetic support 12 which in turn is supported on platform 3.

While the disturbing mass $M_z$ in Fig. 4 was described as having some relation with the magnetic responsive device (in that case part of the orienting means for a total field detector), it is quite unnecessary that this be so. In fact, the disturbing mass may have no relation whatever with the magnetic responsive device and may be used for an entirely extraneous purpose. The only requirement is that its position, that is, its distance from the magnetic responsive device must be capable of being fixed, otherwise it is obvious that compensation could not be properly achieved.

From the foregoing description it is apparent that this invention is practiced by first determining whether or not the disturbing magnetic mass has spherical magnetic properties. If not, it should first be adjusted to a substantial sphere in the magnetic sense so that it has the properties of a magnetic sphere. Then at least two spheres must be arranged on orthogonal axes, with the line between the magnetic centers of the disturbing magnetic mass and the magnetic responsive device forming one axis. The magnetic effect of the disturbing mass is thereby nullified at the origin of the orthogonal system.

Moreover, it is obvious that any convenient non-magnetic structures along the axes of any of the Figs. 1 to 4, inclusive, may be provided for supporting the spheres in the manner shown. Such supports may comprise structures of the type shown for the adjusting sphere $M_z'$ in Fig. 5 so that their distances along their respective axes may be conveniently adjusted. Of course, any other equivalent structure for adjusting their positions along their axes may be substituted without departing from this invention.

The compensating spheres, as well as the adjusting spheres, may be made of any homogeneous magnetic material. Most any ferromagnetic material satisfies this requirement. One convenient method of constructing these spheres has been to compress substantial spheres of Permalloy dust. These substantial spheres are then rolled together with steel balls until they are of the required size and are nearly perfect spheres. Another very practical method has been to use ordinary steel ball bearings after first carefully decarburizing them.

What is claimed is:

1. In a magnetic responsive system wherein a magnetic device is responsive to a magnetic field and a substantially spherical disturbing mass of magnetic material, located near said device, is also under the influence of said field so as to have induced therein a magnetic dipole disturbing to said magnetic field at said device, the compensating system comprising at least two substantially spherical compensating masses of magnetic material, a means supporting said disturbing mass and said compensating masses with their magnetic centers on a system of at least three orthogonal axes and with said device at the origin of said axes, the sizes of said compensating masses and their distances from the origin being proportioned to eliminate the effect of the dipole on the magnetic field at said device.

2. In a magnetic responsive system wherein a magnetic device is responsive to a magnetic field and a disturbing mass of arbitrary shape and of magnetic material, located near said device, is also under the influence of said field so as to have induced therein a magnetic dipole disturbing to said magnetic field at said device, the compensating system comprising an adjusting mass of magnetic material in fixed position with respect to and near said disturbing mass to convert said arbitrary shape to one essentially spherical in a magnetic sense, at least two substantially spherical compensating masses of magnetic material, a means supporting said disturbing mass and said compensating masses with their magnetic centers on a system of at least three orthogonal axes and with said device at the origin of said axes, the sizes of said compensating masses and their distances from the origin being proportioned to eliminate the effect of the dipole on the magnetic field at said device.

3. In a magnetic responsive system wherein a magnetic device is responsive to a magnetic field and a substantially spherical disturbing mass of magnetic material, located near said device, is also under the influence of said field so as to have induced therein a magnetic dipole disturbing to said magnetic field at said device, the compensating system comprising at least two substantially spherical compensating masses of magnetic material, a means supporting said disturbing and said compensating masses with their magnetic centers on a system of at least three orthogonal axes and with said device at the origin of said axes, the sizes of said compensating masses and their distances from the origin being proportioned to slightly overcompensate the effect of the dipole on the magnetic field at said device, and an adjusting sphere of magnetic material adjustably mounted on the same orthogonal axis as is the disturbing mass.

4. In a magnetic responsive system wherein a magnetic device is responsive to a magnetic field and a disturbing mass of arbitrary shape and of magnetic material, located near said device, is also under the influence of said field so as to have induced therein a magnetic dipole disturbing to said magnetic field at said device, the compensating system comprising an adjusting mass of magnetic material in fixed position with respect to and near said disturbing mass to convert said arbitrary shape to one essentially spherical in a magnetic sense, at least two substantially spherical compensating masses of magnetic material, a means supporting said disturbing mass and said compensating masses with their magnetic centers on a system of at least three orthogonal axes and with said device at the origin of said axes, the sizes of said compensating masses and their distances from the origin being proportioned to slightly over-compensate the effect of the dipole on the magnetic field at said device, and an adjusting sphere of magnetic material adjustably mounted on the same orthogonal axis as is the disturbing mass.

5. In a magnetic responsive system wherein a magnetic device is responsive to a magnetic field and a substantially spherical disturbing mass of magnetic material, located near said device, is also under the influence of said field so as to have induced therein a magnetic dipole disturbing to said magnetic field at said device, the compensating system comprising at least two pairs of substantially spherical compensating masses of magnetic material, a means supporting said disturbing mass and said compensating masses with their magnetic centers on a system of at least three orthogonal axes and with said device at the origin of said axes, each pair of compensating masses being mounted coaxially with the origin between them, the sizes of said compensating masses and their distances from the origin being proportioned to eliminate the effect of the dipole on the magnetic field at said device.

6. In a magnetic responsive system wherein a magnetic device is responsive to a magnetic field and a substantially spherical disturbing mass of magnetic material, located near said device, is also under the influence of said field so as to have induced therein a magnetic dipole disturbing to said magnetic field at said device, the compensating system comprising at least two pairs of substantially spherical compensating masses of magnetic material, a means supporting said disturbing mass and said compensating masses with their magnetic centers on a system of at least three orthogonal axes and with said device at the origin of said axes, each pair of compensating masses being mounted coaxially with the origin between them, the sizes of said compensating masses and their distances from the origin being proportioned to slightly overcompensate the effect of the dipole on the magnetic field at said device, and an adjusting sphere of magnetic material adjustably mounted on the same orthogonal axis as is the disturbing mass.

7. In a magnetic responsive system wherein a magnetic device is responsive to a magnetic field and a disturbing mass of arbitrary shape and of magnetic material, located near said device, is also under the influence of said field so as to have induced therein a magnetic dipole disturbing to said magnetic field at said device, the compensating system comprising an adjusting mass of magnetic material in fixed position with respect to and near said disturbing mass to convert said arbitrary shape to one essentially spherical in a magnetic sense, at least two pairs of substantially spherical compensating masses of magnetic material, a means supporting said disturbing mass and said compensating masses with their magnetic centers on a system of at least three orthogonal axes and with said device at the origin of said axes, each pair of compensating masses being mounted coaxially with the origin between them, the sizes of said compensating masses and their distances from the origin being proportioned to eliminate the effect of the dipole on the magnetic field at said device.

8. In a magnetic responsive system wherein a magnetic device is responsive to a magnetic field and a disturbing mass of arbitary shape and of magnetic material, located near said device, is also under the influence of said field so as to have induced therein a magnetic dipole disturbing to said magnetic field at said device, the compensating system comprising an adjusting mass of magnetic material in fixed position with respect to and near said disturbing mass to convert said arbitrary shape to one essentially spherical in a magnetic sense, at least two pairs of substantially spherical compensating masses of magnetic material, a means supporting said disturbing mass and said compensating masses with their magnetic centers on a system of at least three orthogonal axes and with said device at the origin of said axes, each pair of compensating masses being mounted coaxially with the origin between them, the sizes of said compensating masses and their distances from the origin being proportioned to slightly overcompensate the effect of the dipole on the magnetic field at said device, and an adjusting sphere of magnetic material adjustably mounted on the same orthogonal axis as is the disturbing mass.

9. In a magnetic responsive system wherein a magnetic device is responsive to a magnetic field and a substantially spherical disturbing mass of magnetic material, located near said device, is also under the influence of said field so as to have induced therein a magnetic dipole disturbing to said magnetic field at said device, the compensating system comprising four pairs of substantially spherical compensating masses of magnetic material, a means supporting said disturbing mass and two of the four pairs of said compensating masses with their magnetic centers on a system of three orthogonal axes and with said device at the origin of said axes, each of said pairs being mounted coaxially with the origin between them, an additional means similarly supporting the remaining two pairs of compensating masses on a separate orthogonal system angularly displaced from the first system, whereby all of the compensating masses lie in a plane normal to the axis containing the disturbing mass, the sizes of said compensating masses and their distances from the origin being proportioned to eliminate the effect of the dipole on the magnetic field at said device.

10. In a magnetic responsive system wherein a magnetic device is responsive to a magnetic field and a substantially spherical disturbing mass of magnetic material, located near said device, is also under the influence of said field so as to have induced therein a magnetic dipole disturbing to said magnetic field at said device, the compensating system comprising four pairs of substantially spherical compensating masses of magnetic material, a means supporting said disturbing mass and two of the four pairs of said compensating masses with their magnetic centers on a system of three orthogonal axes and with said device at the origin of said axes, each of said pairs being mounted coaxially with the origin between them, an additional means similarly supporting the remaining two pairs of compensating masses on a separate orthogonal system angularly displaced from the first system, whereby all of the compensating masses lie in a plane normal to the axis containing the disturbing mass, the sizes of said compensating masses and their distances from the origin being proportioned to slightly overcompensate the effect of the dipole on the magnetic field at said device, and an adjusting sphere of magnetic material adjustably mounted on the same orthogonal axis as is the disturbing mass.

11. In a magnetic responsive system wherein a magnetic device is responsive to a magnetic field and a disturbing mass of arbitrary shape and of magnetic material, located near said device, is also under the influence of said field so as to have induced therein a magnetic dipole disturbing of said magnetic field at said device, the compensating system comprising an adjusting mass of magnetic material in fixed position with respect to and near said disturbing mass to convert said arbitrary shape to one essentially spherical in a magnetic sense, four pairs of substantially spherical compensating masses of magnetic material, a means supporting said disturbing mass and two of the four pairs of said compensating masses with their magnetic centers on a system of three orthogonal axes and with said device at the origin of said axes, each of said pairs being mounted coaxially with the origin between them, an additional means similarly supporting the remaining two pairs of compensating masses on a separate orthogonal system angularly displaced from the first system, whereby all of the compensating masses lie in a plane normal to the axis containing the disturbing mass, the sizes of said compensating masses and their distances from the origin being proportioned to eliminate the effect of the dipole on the magnetic field at said device.

12. In a magnetic responsive system wherein a magnetic device is responsive to a magnetic field and a disturbing mass of arbitrary shape and of magnetic material, located near said device, is also under the influence of said field so as to have induced therein a magnetic dipole disturbing to said magnetic field at said device, the compensating system comprising an adjusting mass of magnetic material in fixed position with respect to and near said disturbing mass to convert said arbitrary shape to one essentially spherical in a magnetic sense, four pairs of substantially spherical compensating masses of magnetic material, a means supporting said disturbing mass and two of the four pairs of said compensating masses with their magnetic centers on a system of three orthogonal axes and with said device at the origin of said axes, each of said pairs being mounted coaxially with the origin between them, an additional means similarly supporting the remaining two pairs of compensating masses on a separate orthogonal system angularly displaced from the first system whereby all of the compensating axes lie in a plane normal to the axis containing the disturbing mass, the sizes of said compensating masses and their distances from the origin being proportioned to slightly over compensate the effect of the dipole on the magnetic field at said device, and an adjusting sphere of magnetic material adjustably mounted on the same orthogonal axis as is the disturbing mass.

13. In a magnetic responsive system wherein a magnetic device is responsive to a magnetic field and a substantially spherical disturbing mass of magnetic material, located near said device, is also under the influence of said field so as to have induced therein a magnetic dipole disturbing to said magnetic field at said device, the compensating system comprising two substantially spherical compensating masses of magnetic material, a means supporting said disturbing mass and said compensating masses with their magnetic centers on a system of three orthogonal axes and with said device at the origin of said axes, the sizes of said compensating masses and their distances from the origin being proportioned such that the ratios of their radii to their respective distances from the origin are substantially equal to the ratio of the radius of the disturbing mass to its distance from the origin.

CLARENCE H. YOUNG.

REFERENCES CITED

The following references are of record in the file of this patent:

UNITED STATES PATENTS

| Number | Name | Date |
|---|---|---|
| 232,781 | Thomson | Sept. 28, 1880 |
| 780,374 | Negus et al. | Jan. 17, 1905 |
| 1,982,405 | Titterington | Nov. 27, 1934 |
| 2,390,844 | McNish | Dec. 11, 1945 |